United States Patent

Koves et al.

Patent Number: 6,059,961
Date of Patent: May 9, 2000

[54] METHOD TO ALLEVIATE THERMAL CYCLES IN MOVING BED RADIAL FLOW REACTOR

[75] Inventors: William John Koves, Hoffman Estates; Gary Alan Schulz, Arlington Heights; Robert John Sanger, Chicago, all of Ill.

[73] Assignee: UOP LLC, Des Plaines, Ill.

[21] Appl. No.: 09/067,772

[22] Filed: Apr. 27, 1998

[51] Int. Cl.$^7$ ............................................. C10G 11/18
[52] U.S. Cl. ................... 208/146; 208/152; 208/134; 208/143; 208/213; 208/251 H; 208/254 H; 422/177; 422/181; 422/188; 422/189; 422/190; 422/191; 422/192; 422/205; 422/207; 422/218; 422/223; 422/239
[58] Field of Search ............................ 208/146, 152, 208/134, 143, 213, 251 H, 254 H; 422/177, 181, 188–192, 205, 207, 218, 223, 239

[56] References Cited

U.S. PATENT DOCUMENTS

| | | | |
|---|---|---|---|
| 3,072,244 | 1/1963 | Smith | 206/17 |
| 3,647,680 | 3/1972 | Greenwood et al. | 208/65 |
| 3,652,231 | 3/1972 | Greenwood et al. | 23/288 G |
| 3,692,496 | 9/1972 | Greenwood et al. | 23/288 G |
| 3,706,536 | 12/1972 | Greenwood et al. | 23/288 G |
| 3,825,116 | 7/1974 | Greenwood | 209/141 |
| 3,978,150 | 8/1976 | McWilliams, Jr. | 260/683.3 |
| 4,135,886 | 1/1979 | Kuchar | 422/216 |
| 4,141,690 | 2/1979 | Persico et al. | 422/216 |
| 4,250,018 | 2/1981 | Peters | 208/49 |
| 4,277,444 | 7/1981 | Van Landeghem | 422/191 |
| 4,372,920 | 2/1983 | Zardi | 422/148 |
| 4,452,761 | 6/1984 | Farnham | 422/218 |
| 4,859,643 | 8/1989 | Sechrist et al. | 502/37 |
| 4,869,808 | 9/1989 | Vora et al. | 208/138 |
| 4,959,198 | 9/1990 | Koves | 422/220 |
| 5,130,106 | 7/1992 | Koves et al. | 422/216 |

*Primary Examiner*—Walter D. Griffin
*Assistant Examiner*—Nadine Preisch
*Attorney, Agent, or Firm*—Thomas K. McBride; John G. Tolomei

[57] ABSTRACT

A process and arrangement for contacting a moving bed of compact particulate material, usually catalyst, with a radial flow of fluid maintains an unconfined surface of catalyst particles in place by passing fluid axially into the upper surface of the bed and maintaining radial gas flow across an inlet screen at an elevation that is above the upper most elevation of perforations for withdrawing gas flow from the particulate bed. Two vertical screens confine the bed of catalyst. Perforations cover substantially the entire length of the inlet screen. The outlet portion of the screen has perforations that end below the top of the free surface of the catalyst bed and define an upper bed portion therebetween. The inlet screen directs gas flow radially across the inlet screen into an upper portion of the bed and cause at least partial axial flow of gas through the upper portion of the particle bed. The axial gas flow through the upper portion of the particle bed holds the surface of the catalyst in place while also cause the gas to preheat the relatively cold catalyst as it initially enters the particulate bed. Heating of the catalyst in an upper portion moderates transient temperature spikes and depressions that fatigue a critical junction between perforated and unperforated portions of the outlet screen. The preheating of the catalyst in by this method and seal arrangement reduces damage temperature swings on equipment while providing an overall simplified arrangement for a upper seal zone in a bed of compact moving particles.

9 Claims, 10 Drawing Sheets

METHOD TO ALLEVIATE THERMAL CYCLES IN MOVING BED RADIAL FLOW REACTOR

FIELD OF THE INVENTION

This invention relates generally to the field of fluid particle contact and more specifically to apparatus for the moving bed design of radial or horizontal flow fluid solid contacting devices. More specifically, this invention is related to an apparatus for the contacting of a hot fluid stream with particulate material in a particle bed from which particles are periodically added and withdrawn.

BACKGROUND OF THE INVENTION

A wide variety of processes use radial or horizontal flow reactors to effect the contact of a compact bed of particulate matter with a fluid and in particular a gaseous stream. These processes include hydrocarbon conversion, adsorption and exhaust gas treatment. In most of these processes, contact of the particulate material with the fluid decreases the effectiveness of the particulate material in accomplishing its attendant function. In order to maintain the effectiveness of the process, systems have been developed whereby particulate material is semi-continuously withdrawn from the contacting zone and replaced by fresh particulate material so that the horizontal flow of fluid material will constantly contact a compact bed of particulate material having a required degree of effectiveness. Typical examples and arrangements for such systems can be found in U.S. Pat. Nos. 3,647,680, U.S.

Pat. No. 3,692,496 and U.S. Pat. No. 3,706,536 the contents of which are hereby incorporated by reference. A good example of the way in which moving bed apparatus has been used for the contacting of fluids and solids is found in the field of petroleum and petrochemical processes especially in the field of hydrocarbon conversion reactions. Many hydrocarbon conversion processes can also be effected with a system for continuously moving catalyst particles as a compact column under gravity flow through one or more reactors having a horizontal flow of reactants. One such process is the dehydrogenation of paraffins as shown in U.S. Pat. No. 3,978,150.

Another well-known hydrocarbon conversion process that uses a radial flow bed for the contact of solid catalyst particles with a vapor phase reactant stream is found in the reforming of naphtha boiling hydrocarbons. This process uses one or more reaction zones wherein the catalyst particles enter the top of the reactor, flow downwardly as a compact column under gravity flow and are transported out of the first reactor. In many cases, a second reactor is located either underneath or next to the first reactor. Catalyst particles again move through the second reactor as a compact column under gravity flow. After passing through the second reactor, the catalyst particles may pass through additional reaction zones before collection and transportation to a regeneration vessel for the restoration of the catalyst particles by the removal of coke and other hydrocarbon by-products that accumulate on the catalyst in the reaction zone.

In the reforming of hydrocarbons using the moving bed system, the reactants typically flow serially through the reaction zones. The reforming reaction is typically endothermic so the reactant stream is heated before each reaction zone to supply the necessary heat for the reaction. The reactants flow through each reaction zone in a substantially horizontal direction through the bed of catalyst. The catalyst particles in each reaction zone are typically retained between an inlet screen and an outlet screen that together form a vertical bed and allow the passage of vapor through the bed. In most cases the catalyst bed is arranged in an annular form so that the reactants flow radially through the catalyst bed.

Experience has shown that the horizontal flow of reactants through the bed of catalyst can interfere with the gravity flow removal of catalyst particles. This phenomenon is usually referred to as hang-up or pinning and it imposes a constraint on the design and operations reactors with a horizontal flow of reactants. Catalyst pinning occurs when the frictional forces between catalyst pills that resist the downward movement of the catalyst pills are greater than the gravitational forces acting to pull the catalyst pills downward. The frictional forces occur when the horizontally flow vapor passes through the catalyst bed. When pinning occurs, it traps catalyst particles against the outlet screen of the reactor bed and prevents the downward movement of the pinned catalyst particles. In a simple straight reactor bed, or an annular bed with an inward radial flow of vapors, pinning progresses from the face of the outlet screen and as the vapor flow through the reactor bed increases, it proceeds out to the outer surface of the bed at which point the bed is described as being 100% pinned. Once pinning has progressed to the outermost portion of the catalyst bed, a second phenomenon called void blowing begins. Void blowing describes the movement of the catalyst bed away from an inlet screen by the forces from the horizontal flow of vapor and the creation of a void between the inlet screen and an outer catalyst boundary. The existence of this void can allow catalyst particles to blow around or churn and create catalyst fines. Void blowing can also occur in an annular catalyst bed when vapor flows radially outward through the bed. With radially outward flow, void blowing occurs when the frictional forces between the catalyst pills are greater than the gravitational forces, or in other words, at about the same time as pinning would occur with a radially inward flow. Therefore, high vapor flow can cause void blowing in any type of radial or horizontal flow bed.

The production of fines can pose a number of problems in a continuous moving bed design. The presence of catalyst fines increases the pressure drop across the catalyst bed thereby further contributing to the pinning and void blowing problems, can lead to plugging in fine screen surfaces, contributes to greater erosion of the process equipment, and in the case of expense catalysts imposes a direct catalyst cost on the operation of the system. Further discussion of catalyst fines and the problems imposed thereby can be found in U.S. Pat. No. 3,825,116 which also describes an apparatus and method for fines removal.

Where possible, horizontal or radial flow reactors are designed and operated to avoid process conditions that will lead to pinning and void blowing. This is true in the case of moving bed and non-moving bed designs. Apparatus and methods of operation for avoiding or overcoming pinning and void blowing problems are shown in U.S. Pat. Nos. 4,135,886, 4,141,690 and 4,250,018.

Another problem that can effect radial flow reactors is fluidization of the upper particle bed surface and subsequent displacement or attrition of the catalyst particles. Fixed bed radial flow reactors commonly employ a variety of hold down methods to prevent fluidization of the top surface such as cover plates, inert packing material, or both. Typical cover plate and sealing arrangements for the top of fixed bed radial flow reactors are shown in U.S. Pat. Nos. 4,452,761 and 3,027,244. It has also been taught in a fixed bed arrangement to redirect a portion of the entering fluid from radial flow through the side of the bed to axial flow onto the top of the bed. This axial redirection of entering fluid provides containment of the upper bed surface as shown in U.S. Pat. No. 4,372,920. Moving bed reactors pose more difficulties since catalyst must be replaced while the upper surface of the bed remains in a sealed condition. High gas flows can be particularly disruptive and lead to fluidization and unwanted displacement of catalyst particles into other portions of the reactor internals. Complicated cover plate assemblies can stabilize the upper surface of the compact particle bed. U.S. Pat. No. 4,277,444 shows a system for confining an upper surface of a compact bed in a moving catalyst bed system. U.S. Pat. No. 5,130,106 shows a confining cover plate assembly that maintains downward pressure on the catalyst and prevents upward expansion of the bed.

Although the known cover plate assemblies can confine the upper bed surface and limit or prevent fluidization and churning of the catalyst, the transfer of catalyst in confined assemblies has resulted in occasional problems of cracking at weld seems due to thermal fatigue. The failures usually occur at a weld joint between a center screen and an imperforate screen section (hereinafter referred to as a "blank-off") designed to retain a sealing layer of catalyst above the compact catalyst bed.

BRIEF SUMMARY OF THE INVENTION

It is an object of this invention to simplify reactor internals for moving a compact bed of catalyst through a contacting vessel.

It is a further object of this invention to provide a system that prevents cracking problems at joints between screen and blank off elements in reactor internals.

Recent discoveries show that the cycling of the catalyst into the bed of the contacting zone results in thermal fatigue that leads to the above mentioned cracking problems. Cold catalyst that enters the sealed zone from above cools the hot gas in the seal zone along with the adjacent screen elements. As the hot seal gas heats up the catalyst, the temperature of the containment elements reaches the temperature of the hot gas until another transfer of catalyst occurs and the cycle repeats itself.

This invention is a change in the seal designs that improves the life of the containment elements and simplifies the overall design of the contacting vessel internals at the top of the compact bed. The invention modifies the seal at the top of the compact bed to heat catalyst before it contacts the screen section. The invention maintains the upper surface of the catalyst bed open to an entering flow of seal gas. The seal gas is free to flow upwardly out of an annular distribution space that distributes the radial flow of fluid along the surface of the radial flow catalyst bed. The entire inlet side of the screen may be kept completely open to allow full flow of the process fluid therethrough. The modification to the seal design eliminates most if not all of the blank-off from the outer screen. Eliminating the blank from the screen routes at least a portion of the seal gas horizontally across bed in addition to its usual vertical flow direction. This rerouting of the seal gas flow brings in more seal gas and preheats the cold catalyst, thereby reducing the temperature extremes of any thermal cycle. The addition of a small blank-off band at the top of the catalyst bed can protect the uppermost bed surface from any disturbance caused by the inflow of process gas which could create surface instability at the point where the entering radial gas flow at the upper surface of the bed is about equal to any downward axial flow of gas for containment of the bed.

The invention may also improve the reliability of the junction between screen elements by providing a solid piece of blank off that extends over any welded sections. A weld blank-off section may be beneficially added to cover any weld junction in the inlet screen. A narrow welded blank-off section covering any weld on the screen and separating the weld from the particulate material that passes through the bed and from the seal gas flow can provide enough temperature moderation to significantly reduce stresses in the weld area. Therefore, by extending the solid piece of blank-off for a short distance above and below the weld the maximum thermal stress moves away from the weld junction.

An intermediate blank-off in the inlet screen can also provide multiple advantages. The intermediate blank-off occupies a space at the bottom of the seal zone and separates the lower section of the perforated inlet screen from the upper section of the perforated screen located in the seal zone. Such a blank-off provides the advantage of forcing seal gas higher into the relatively colder catalyst located in the upper portion of the seal zone. Forcing seal gas higher into the seal volume produces a flow field that is closer to cocurrent flow rather than the typical cross-flow. A closer approach to cocurrent flow provides a more effective heat transfer, reduces the thermal cycle, and increases the axial flow relative to the radial flow at the inner screen outlet. Incorporation of the intermediate blank-off can also result in a higher local pinning margin, i.e. more tolerance against pinning, where seal gas enters the center pipe. Specifically, the intermediate blank-off provides for more efficient utilization of the seal gas thereby tending to reduce pinning at the inner screen.

In a broad embodiment this invention is a process for passing a fluid in a cross flow direction through a compact bed of particulate material and periodically replacing the catalyst particles while maintaining the flow of the fluid. The process confines a particulate material in a vertically extended bed between an inlet partition having perforations extending over at least a part of its height and an outlet partition having a lower perforated section and upper section. Sizing of the perforations retains the particulate material while permitting gas flow. A first portion of the fluid stream passes into the bed in a direction substantially transverse to the direction of catalyst movement. The first portion passes through a first perforated section of the inlet partition located at or below the imperforate section of the outlet partition. A second fluid portion of the fluid stream passes through a second perforated section of the inlet partition located above the perforated portion of the outlet partition. The process recovers a third portion of the fluid stream from the perforated section of the outlet partition. At least periodically the process withdraws particulate material from the bottom of the vertically extended bed and adds particulate material to the top of the vertically extended bed. Optionally, a fourth portion of the fluid stream passes in substantially unrestricted flow to the top of the particles in the vertically extended bed.

In another embodiment this invention is an apparatus for passing a fluid in a cross flow direction through a compact bed of particulate material and periodically replacing the catalyst particles while maintaining the flow of the fluid. The apparatus comprises a vertically elongated inlet partition and a vertically elongated outlet partition, in a spaced apart relationship, that at least partially define a particle retention space and a retention space opening at an upper locus of the partitions for passing particles into the retention space. At least part of the inlet partition defines perforations. The outlet partition defines an upper imperforate section and a lower perforated section. The size of the perforations in both partitions retain particles while permitting fluid flow. A first perforated section of the inlet partition located at or below the imperforate section of the outlet partition at least partially defines a distribution chamber. A substantially open flow channel between the retention space opening and the distribution chamber provides substantially unrestricted flow to the retention space opening from the distribution chamber. A second perforated section of the inlet partition located above the perforated portion of the outlet partition has substantially unrestricted communication with the distribution chamber and the retention space opening. The perforated portion of the outlet partition defines at least part of a collection chamber. The apparatus also provides means for passing particulate material into the inlet opening.

In a more limited embodiment this invention is a radial flow bed arrangement for contacting particulate material with a gaseous material. The arrangement comprises a vertically oriented center conduit having a plurality of perforations and a hollow interior for gas transfer; a vertically elongated retention screen surrounding the center conduit and together therewith defining an annular retention space between the center conduit and the retention screen for retaining particles; a vertically oriented center pipe welded to the top of the center conduit; an annular retention opening at the top of the annular retention space defined in part by the vertically oriented center pipe; a weld shroud comprising a narrow band encircling the outside of the center pipe and the center conduit at the weld; and, means for intermittently withdrawing particles from the bottom of the retention space and adding particles to the retention space.

Other objects, embodiments and details of this invention are disclosed in the following detailed description.

DETAILED DESCRIPTION OF THE INVENTION

The particle containment system of this invention can be applied to any form of moving bed contacting system where particles flow downward in a compact bed and fluid contacts the particles by horizontal movement through the fixed bed. The terms "compact bed" or "compact column" of particulate material in this invention refer to a state wherein the particles rest on top of each other whether moving or stationary—as opposed to a fluidized bed where gas flow creates lift on the particles to create void spaces between the particles in a fluidized movement of particles.

The flow distribution arrangement itself can achieve this invention's objectives of simplifying the cover plate arrangement for a moving bed reactor and of preventing damage to screen elements due to thermal cycling. The elimination of damage to welds and screens due to thermal cycling may also be prevented by the use of the weld shroud of this invention. Accordingly, this invention solves the problem of weld fatigue or failure during thermal cycles by either a control of the flow distribution or the addition of a shroud over the weld.

The apparatus and method of this invention are particularly adapted for the radial or cross flow of a fluid stream through a particle bed. The particle bed would typically be maintained as a relatively thin and vertically extended layer of catalyst particles through which the fluid will pass transversely. The fluid is typically a gas stream comprising hydrocarbons or other reactants. The bed may have a flat shape, but in most cases, it is arranged in a annular form by inner and outer perforated partition elements. The thickness of the bed over its height may also vary and is advantageously in some regeneration processes arranged to increase down the length of the bed.

A process that can use radial flow bed and in which this invention may be particularly useful is the dehydrogenation of the paraffinic hydrocarbons. The feed usually consists of a combination of fresh paraffinic hydrocarbon feed, recycled hydrogen and recycled unconverted hydrocarbons. In its preferred form, the dehydrogenation process consumes a feed hydrocarbon comprising normal paraffinic hydrocarbons having from 3 to 22 carbon atoms per molecule. The reactant stream is heated and the reactor is maintained at proper dehydrogenation conditions of temperature and pressure which are well known to those skilled in the art before it is passed through the bed of catalyst contained in retention space of the type described for this invention. The reactants entering the bed are in vapor phase condition. The effluent from the process typically undergoes treatment for the separation of hydrogen by condensing the heavier components into a liquid phase process stream and the recovery of hydrogen and light hydrocarbon gas. This gas supplies hydrogen that is combined with the incoming feed stream. Process details for combining and heating the feed stream as well as the recovery and separation of effluent products are well known to those skilled in the art.

The composition of the dehydrogenation catalyst is not believed to materially effect the operation of the process provided the catalyst meets commercial standards for activity, stability and selectivity. Dehydrogenation catalysts are described in U.S. Pat. Nos. 3,274,287; 3,315,007; 3,315,008; 3,745,112; and 4,430,517. These catalysts are comprised of a platinum group component supported on a porous carrier material. The preferred carrier material is a refractory inorganic oxide such as gamma-alumina. The preferred dehydrogenation catalysts contain on an elemental basis 0.01 to 2 wt. % platinum group component and about 0.1 to 5 wt. % of an alkali or alkaline earth metal. Preferably, there is present 0.05 to 1 wt. % platinum group component and about 0.25 to 3.5 wt. % of the alkali or alkaline earth component. The platinum group component may be chosen from the group consisting of platinum, palladium, rhodium, ruthenium, osmium, and iridium, but platinum is highly preferred. The alkali or alkaline earth component may be selected from the group consisting of the alkali metals—cesium, rubidium, potassium, sodium, and lithium; and the alkaline earth metals—calcium, strontium, barium, and magnesium. This component is preferably either lithium or potassium, with lithium being especially preferred. Another example of a suitable dehydrogenation catalyst is a catalyst which in addition to the previously described platinum and alkali or alkaline earth metal components contains a tin component. This catalytic composite would contain from about 0.1 to about 1 wt. % tin. Yet another catalytic composite which should be highly suited for use in the subject process comprises an indium component in addition to the platinum, tin, and alkali or alkaline earth components. The indium component may be present on an elemental basis equal to about 0.1 to about 1 wt. % of the final composite. It is also known in the art that some catalytic composites of this nature may benefit from the presence of a small amount of a halogen component, with chlorine being the normally preferred halogen. Typical halogen concentrations in the final catalytic composite range from about 0.1 to about 1.5 wt. %. A halogen component is not desired in all situations. These catalytic composites are known to those skilled in the art and are described in the available references.

The application of the apparatus and process of this invention to a particulate material in a vertically extended bed while gas flows transversely or in cross flow through the bed is more readily appreciated with reference to the figures of the specification. Looking then at the drawings FIG. 1 discloses a regeneration apparatus for the reconditioning of reforming catalyst particles in catalytic reforming process. Due to its particular suitability the discussion of the invention will focus on its application to a catalytic reforming reaction and regeneration system. It is not intended that such discussion limit the scope of the invention except as set forth in the claims.

Catalytic reforming is another well established hydrocarbon conversion process employed in the petroleum refining industry for improving the octane quality of hydrocarbon feedstocks, the primary product of reforming being motor gasoline. The art of catalytic reforming is well known and does not require detailed description herein other than as necessary to understand the operation of the process.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions. Further information on reforming processes may be found in, for example, U.S. Pat. Nos. 4,119,526 (Peters et al.); 4,409,095 (Peters); and 4,440,626 (Winter et al.)

A catalytic reforming reaction is normally effected in the presence of catalyst particles comprised of one or more Group VIII noble metals (e.g., platinum, iridium, rhodium, palladium) and a halogen combined with a porous carrier such as a refractory inorganic oxide. The halogen is normally chlorine. Alumina is a commonly used carrier. The preferred alumina materials are gamma, eta, and theta alumina with gamma and eta alumina giving the best results. An important property related to the performance of the catalyst is the surface area of the carrier. Preferably, the carrier will have a surface area of from 100 to about 500 $m^2/g$. The particles are usually spheroidal and have a diameter of from about $1/16^{th}$ to about $1/8^{th}$ inch (1.5–3.1 mm), though they may be as large as $1/4^{th}$ inch (6.3 mm). In a particular regenerator, however, it is desirable to use catalyst particles which fall in a relatively narrow size range. A preferred catalyst particle diameter is $1/8^{th}$ inch (3.1 mm).

During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

The present invention is applicable to a moving bed regeneration or reaction zone. Fresh catalyst particles are fed to a reaction zone, which may be comprised of several subzones, and the particles flow through each zone by gravity. Catalyst is withdrawn from the bottom of the reaction zone and transported to a regeneration zone where a hereinafter described multi-step regeneration process is used to recondition the catalyst to restore its full reaction promoting ability. Catalyst flows by gravity through the various regeneration steps and then is withdrawn from the regeneration zone and furnished to the reaction zone. Movement of catalyst through the zones is often referred to as continuous though; in practice, it is semi-continuous. By semi-continuous movement is meant the repeated transfer of relatively small amounts of catalyst at closely spaced points in time. For example, one batch per minute may be withdrawn from the bottom of a reaction zone and withdrawal may take one-half minute; that is catalyst will flow for one-half minute. If the inventory in the reaction zone is large, the catalyst bed may be considered to be continuously moving. A moving bed system has the advantage of maintaining production while the catalyst is removed or replaced.

When using the method of this invention in a regeneration process, catalyst is contacted with a hot oxygen-containing gas stream (known in reforming processes as recycle gas) in order to remove coke. Coke is comprised primarily of carbon, but it is also comprised of a relatively small quantity of hydrogen. The mechanism of coke removal is oxidation to carbon monoxide, carbon dioxide, and water. Coke content of spent catalyst may be as much as 20% of the catalyst weight, but 5–7% is a more typical amount. Within the combustion zone, coke is usually oxidized at temperatures ranging from 850–1000° F., but temperatures in localized regions may reach 1100° F. or more. The recycle gas contains a low concentration of oxygen usually on the order of 0.5 to 1.5% by volume. The arrangement of a typical combustion section may be seen in U.S. Pat. No. 3,652,231. This configuration is disclosed in U.S. Pat. No. 4,859,643; the contents of which are incorporated by reference. As the coke is combusted, the small amount of hydrogen within the coke reacts with the oxygen to form water. Flue gas made up of carbon monoxide, carbon dioxide, water, unreacted oxygen, chlorine, hydrochloric acid, nitrous oxides, sulfur oxides and nitrogen is collected from the combustion section and withdrawn from the regeneration zone as flue gas. Systems for recovering flue gas and circulating recycle gas are well known to those skilled in the art.

Following combustion of coke, the catalyst often passes to other treatment zones. The catalyst may pass to a chlorination zone. The chlorination zone provides a chlorine containing compound that will react with hydroxyl groups on the catalyst support to provide active chloride on the catalyst. After chlorination, the catalyst particles may enter a drying zone where the water is left on the catalyst particles after the combustion process is removed. Water is evaporated from the surface and pores of the catalyst particles by contact with a heated gas stream. The regeneration process and apparatus may include an additional zone for cooling catalyst particles.

A preferred form of the combustion zone uses screens to contain the coke containing catalyst particles in a tapered bed configuration while combustion gas passes radially through the bed. The terms "inlet screen" and "outlet screen" are used generally to describe any type of perforated element that may distribute or collect the fluid while containing the catalyst particles in a confined space. Suitable screen elements consisting of profile wire or other perforated members are well known to those skilled in the art. Another preferred form of distributing gas and providing a containment space is by the use of extended conduits that have a scalloped shaped profile and are commonly referred to as "scallops".

Figure 1:
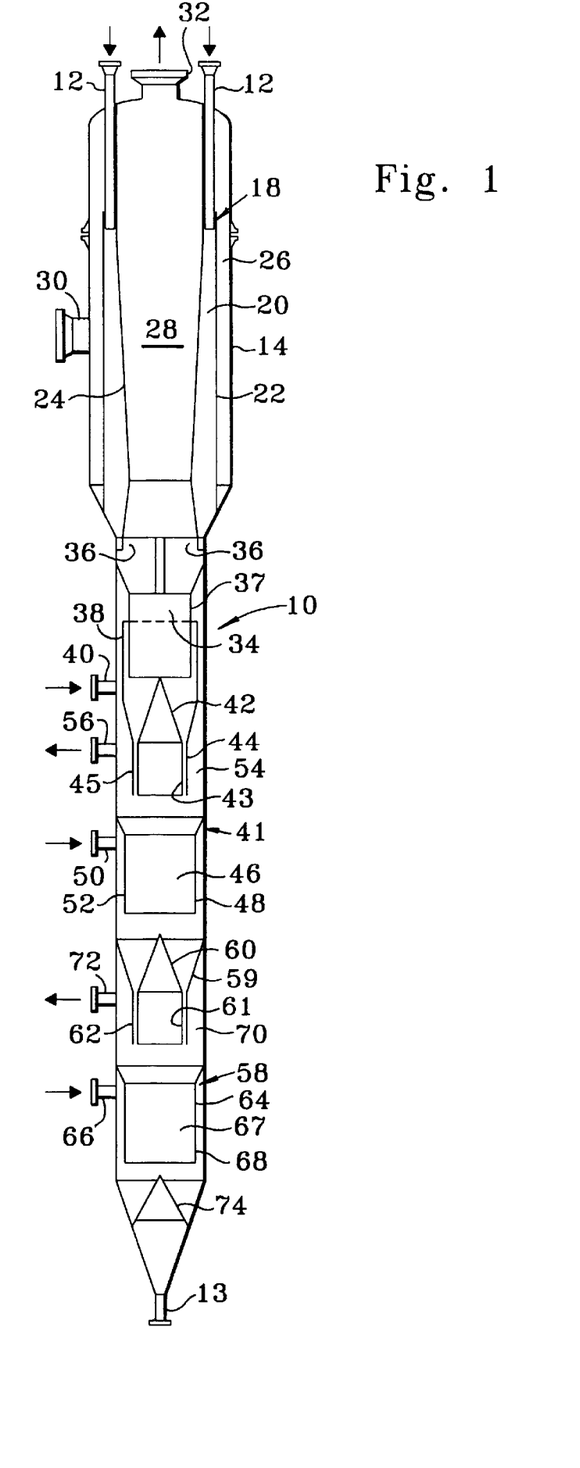
FIG. 1 is a sectional elevation of the regeneration apparatus showing the location of the apparatus of this invention.

The drawings show only elements and equipment that are essential to a clear understanding of the invention. The application and use of additional required items are well within the purview of one skilled in the art. FIG. 1 provides a general overview of a reforming regeneration process and regeneration apparatus. Like numerals have been used throughout 1 through 4 to describe like elements. Particulate material comprising spent catalyst particles containing about 5 wt % coke are introduced into a regeneration vessel 10 through nozzles 12. Catalyst exits the regenerator through a bottom nozzle 13. The withdrawal of catalyst from bottom nozzle 13 controls the flow rate of catalyst through the system. The flow rate may be either continuous or intermittent. The arrangement of the apparatus provides a continuous downward flow path of compact catalyst through the regeneration vessel. The entire volume of the continuous catalyst flow path remains full of catalyst during the operation of the regeneration zone.

Regeneration vessel 10 has an upper combustion section 14. Deactivated catalyst particles are distributed from nozzles 12 at the top of combustion section 14 into a particle inlet zone 18 arranged in accordance with this invention that delivers particulate material into a catalyst bed 20. In preferred form, the regeneration vessel 10 is cylindrical and catalyst bed 20 has the configuration of an extended annulus. An outer partition in the form of cylindrical screen 22 and an inner partition in the form of cylindrical screen 24 retain the deactivated catalyst particles in the preferred arrangement of an extended annular bed. Preferably, one or both screens 22 and 24 give the bed a tapered configuration. An annular space just inside the shell of regeneration vessel 10 and to the outside of screen 22 defines an inlet chamber 26 for receiving an oxygen-containing regeneration gas. The volume to the inside of screen 24 provides a central collection chamber 28. Oxygen-containing regeneration gas or recycle gas enters inlet chamber 26 through a nozzle 30, flows essentially radially through bed 20 and exits the combustion section from the collection chamber through an upper nozzle 32 located in an upper portion of combustion section 14. Removal of coke by combustion produces coke depleted catalyst particles.

In a preferred form, combustion section 14 passes deactivated catalyst downwardly from bed 20 into a chlorination zone 34 that holds catalyst as a dense bed. In preferred form, catalyst passes from screen outlets 36 into an open volume defined by a downwardly extending chlorination baffle 37 that forms a dense bed drying zone. A chlorination gas comprising a mixture of a chlorine compound input stream and a drying gas passes through a two pass baffle system 38 before entering the bottom of dense bed chlorination zone 34. The chlorine compound input stream enters baffle system 38 through a nozzle 40. Chlorination gas, after contact with the catalyst particles in dense bed chlorination zone 34, passes upwardly into central collection chamber 28. As the chlorination gas passes into upper collection chamber 28, it furnishes oxygen to the spent regeneration gas for return to the combustion zone. The recycle gas thereby supplies the oxygen needed for further combustion of coke from the catalyst particles.

Chlorided catalyst from dense bed 34 flows downwardly around a conical baffle 42 and into an annular holdup zone 45 defined by a lower cylindrical portion 43 of conical baffle 42 and a lower cylindrical portion of truncated baffle 44. An annular volume of catalyst retained between baffles 44 and 43 provides a gas seal to limit the flow of drying gas upwardly through the catalyst particles into bed 34. Catalyst particles that leave annulus 45 form a central dense bed drying zone 46 defined by a lower drying baffle 48.

A drying gas enters the drying zone 41 via nozzle 50 and flows downwardly through an annulus 52 defined by the wall of vessel 10 and the outside of lower drying zone 48. Annulus 52 distributes the drying gas around the circumference of central dense bed drying zone 46. The drying gas takes up moisture as it passes upwardly through catalyst in central space 46. Pressure drop provided by annulus 45 forces the majority of the upward flowing drying gas into an annulus 54. Most of the moisture laden drying gas flows upwardly out of annular space 54 and into baffle system 38. Nozzle 56 withdraws any amount of drying gas that are in excess of those required in the chlorination zone.

Following drying, the dried catalyst particles from drying zone 41 may continue to pass downwardly into a cooling zone 58. An upper cooling baffle 59 and a conical cooling baffle 60 with a central cylindrical portion 61 receives dried catalyst particles from drying zone 41 and holds dried catalyst particles in an annulus 62 defined between cylindrical portion 61 and the inside of upper cooling baffle 64. A central dense bed of dried catalyst 67 is defined by a central portion of a drying baffle 64. The dense bed of catalyst receives catalyst from annulus 62. Cooling gas enters the regeneration vessel through a nozzle 66 and flows downwardly through an annular space 68 to distribute cooling gas over the entire perimeter of the dense bed cooling zone. Cooling gas flows upwardly through the dense bed 67 and pressure drop created by the buildup of catalyst particles in annular space 62 diverts the majority of the cooling gas into an annular space 70 from which a nozzle 72 withdraws the cooling gas from the regeneration vessel. Cooled catalyst particles from the cooling zone pass downwardly, around a conical baffle 74 and out of the regeneration vessel through nozzle 13.

Figure 2:
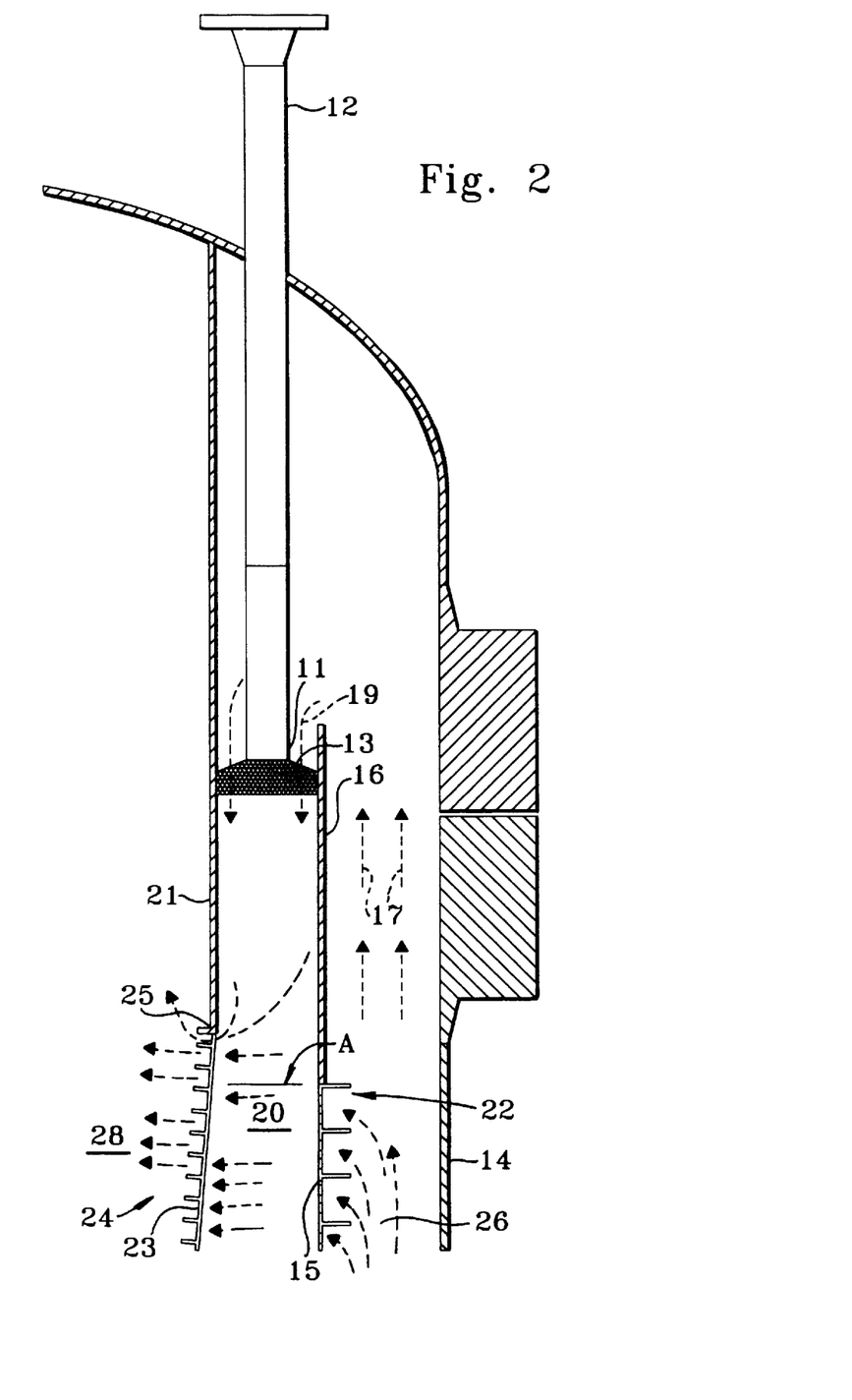
FIG. 2 is an enlarged portion of the cross-sectional elevation of FIG. 1 showing a prior art arrangement in the location for the apparatus of this invention.

A better understanding of the seal designed for the moving bed reactor can be obtained by reference to FIG. 2. FIG. 2 shows a typical prior art seal design. Particulate material flowing from nozzle 12 which serves as a catalyst transfer conduit discharges catalyst from an outlet end 11 forming a collection of catalyst particles with a truncated conical surface 13 at the top of catalyst bed 20. Gas entering distribution space 26 from below flows radially across a perforated portion 15 of inlet screen 22. Inlet screen 22 has an imperforate portion 16 located above line A. A portion of the flow from distribution space 26 flows as a seal gas upwardly along flow line 17 and across conical catalyst surface 13 as shown by flow lines 19. Seal gas flow continues downward through an upper portion of bed 20 between imperforate partition section 16 and an imperforate partition section 21 of an inner partition 24. Seal gas flow passing downwardly through upper portion of catalyst bed 20 joins the majority of the gas flow passing radially through the bed through screen section 15. All of the gas from distribution space 26 enters collection space 28 by passing through perforated portion 23 of partition 24.

Periodically, a portion of the particles are withdrawn from the bottom of bed 20 to move the catalyst. Particles that replace the withdrawn particles flow through nozzle 12 and into the top of bed 20 from outlet 11. The particles, as they first enter the top of bed 20, are relatively cold in comparison to the particles that have already been in bed 20 in the area of the perforated screens 23 and 15. The entering catalyst may have a temperature differential between the gas and catalyst already in the regeneration zone of from 500° F. to 800° F. The initial movement of the entering catalyst downwardly through upper portion of bed 20 has a significant cooling effect on the 25 junction between the imperforate partition section 21 and the top of screen section 23. Gas passing through the relatively cold catalyst heats the catalyst in the direction of fluid flow. Contact with the catalyst cools the gas which in turn cools the screen in the vicinity of junction 25. The typical welded construction makes junction 25 particularly susceptible to fatigue by these recently discovered cycles of repeated cooling and heating.

Figure 3:
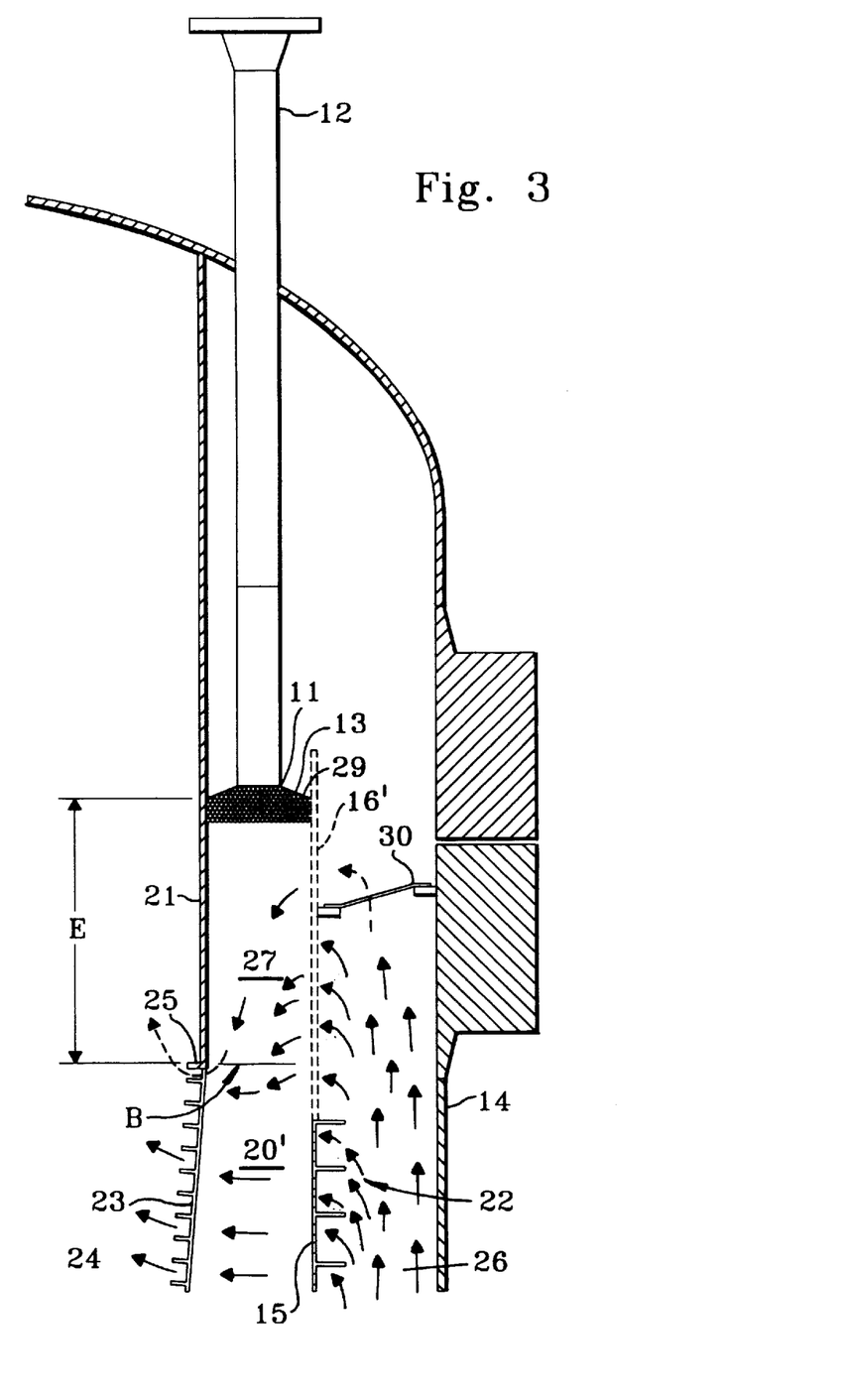
FIG. 3 is an enlarged view of an upper portion of the cross-section FIG. 1 showing one arrangement for the apparatus of this invention.

FIG. 3 shows the modification of the screen arrangement of FIG. 2 in accordance with this invention. In this modification, imperforate partition section 16 has been replaced by a perforated screen section 16' located above perforated screen section 15. More specifically perforated screen section 16' extends above the level indicated by line B in FIG. 3 and above which the perforated portion of partition 24 ends. Perforated partitions 16' allows a portion of the gas flowing through distribution space 26 to pass into an upper portion 27 of bed 20'. Imperforate section 21 of partition 24 borders the opposite side of upper bed portion 27. The portion of the gas flow that crosses perforated section 16' supplies substantial heating to the colder catalyst at an upper location in bed portion 27 thereby raising the temperature of the entering catalyst before it reaches junction 25. Heating of the catalyst above junction point 25 reduces the extremes in temperature associated with the cyclic addition of cold catalyst. Depending upon the length of section 16' all of the flow from distribution space 26 passing above perforated screen 23 into upper bed space 27 may pass across screen 16'. The additional space for the inflow of fluid above the top of the particle bed is provided by extending the screen member above the particle bed.

As the elevation of bed surface 13 is reduced relative to level B, additional gas will flow upward from distribution space 26 and across upper bed surface 13. This invention can function equally well whether all of the flow entering upper bed space 27 passes through the perforated section of screen 16' or a reduced height of bed surface 13 diverts a portion of the entering gas flow across bed surface 13. Preferably the arrangement will pass at least 1 volume % of the fluid entering the distribution space through the upper bed space 27 and no more than 10 vol % of the entering fluid through the distribution space.

However, higher gas velocity at or near the catalyst bed surface 13, can increase the likelihood of unexpected catalyst fluidization and movement of catalyst particles from the unconfined surface. In regard to surface 13 the highest point of instability lies at the outer portion of the upper catalyst surface where it contacts screen 16' at a point 29. As a precaution against displacement of the catalyst by any unusual disturbance of the catalyst bed surface, a suitable fluid permeable, but catalyst impermeable, member may be extended across the opening at the top of the fluid distribution space. For example, flexible screen 30 may bridge the top of distribution space 26 between screen 16' and the wall 14 of the vessel to prevent and fluidized catalyst from flowing into distribution space 26.

Figure 4:
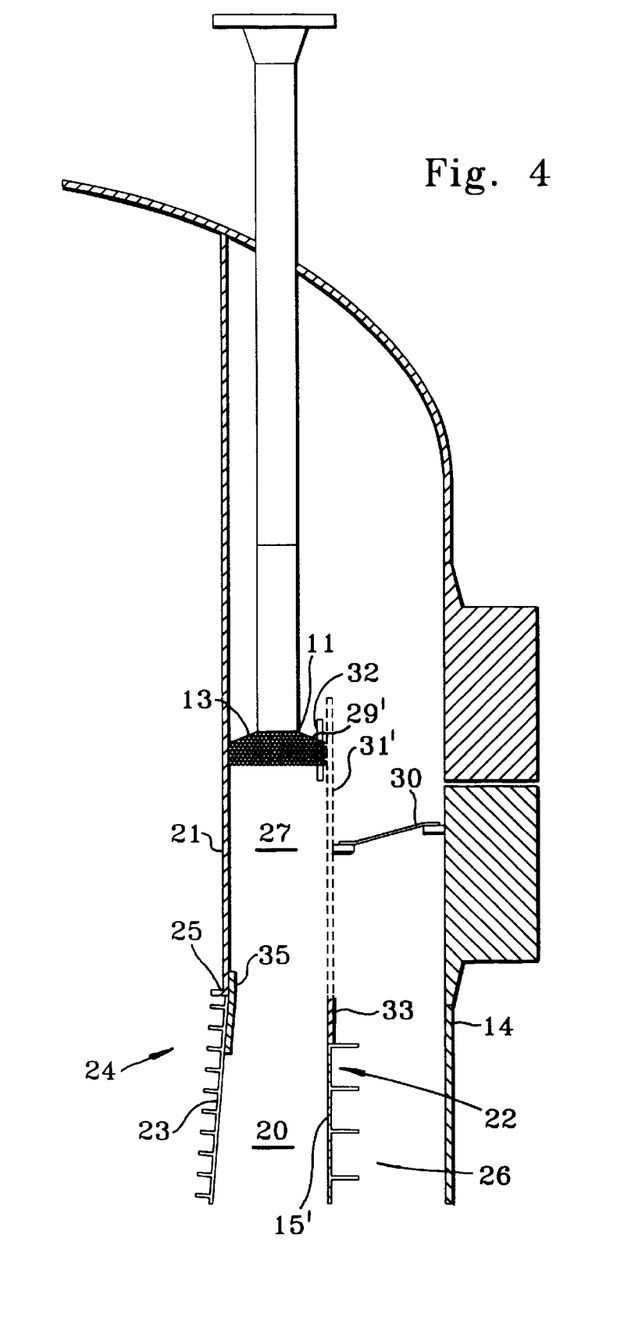
FIG. 4 is a view similar to FIG. 3 showing a modified version of the apparatus of this invention.

As a further method of preventing any instability in the catalyst surface at point 29, i.e. where the free surface of the catalyst contacts the perforated inlet partition, the holes may be omitted from the partition or a blank off plate may be added to prevent gas flow through that section of the inlet screen. FIG. 4 illustrates an arrangement of a blank off plate 32 covering an inlet screen 31 at the location of a contact point 29' between the free surface 13 of catalyst bed 20 and the inlet partition. Plate 32 extends over the entire width of the screen 31 in a direction normal to the gas flow. Plate 32 prevents any gas flow through screen 31 above and below the point where the free surface of the catalyst contacts screen 31. Plate 32 may be substituted by eliminating the perforations from screen 31 in the area immediate adjacent to the point where the free surface of the catalyst is expected to contact it. The distance that the blank-off or plate 32 extends above and below the contact point 29' is typically at least 1 inch and usually not more than 3 inches.

A blank-off may also be used to further control the flow into upper bed portion 27. FIG. 4 shows a blank off section 33 that eliminates perforations between lower screen section 15' and upper screen section 31'. Blank-off section 33 may serve the dual purposes. It can divert additional fluid flow from distribution space 26 into upper section 27 and free surface 13 of the catalyst bed to provide a better seal and hold down of catalyst along free surface 13. Blank-off 33 can also control gas flow over bed 27 itself by providing more gas flow through to the higher portions of section of bed 27. Increased gas flow to the higher elevation portions of upper bed 27 increases the heating of the catalyst and reduces temperature swings at junction 25. Typically blank-off section 33 will provide an imperforate band over a height of at least 2 inches with a maximum height at least 3 inches below the top of bed 27.

Figure 5:
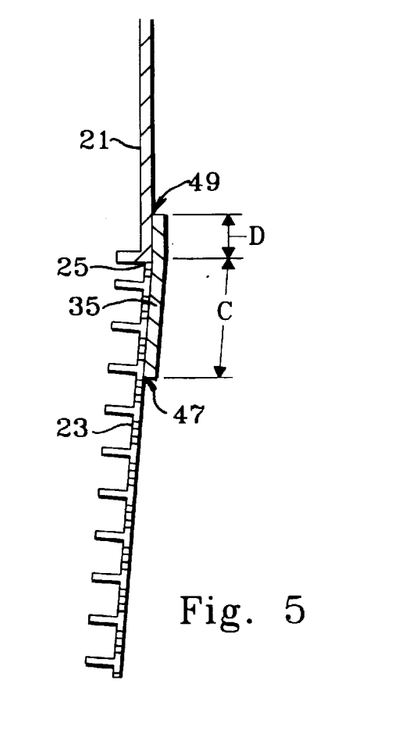
FIG. 5 is an enlarged view of a portion of FIG. 4.

FIG. 4 also shows a shroud 35 that extends around the outside of partition 24 at the location of junction 25. Shroud 35 protects junction 25 from the thermal effects associated with the flow of hot gases through the upper most portion of screen section 23 in the immediate proximity where cold catalyst contacts the lower most part of imperforate partition section 21. Plate 35 alleviates temperature effects of the catalyst by forcing the gas to exit further away from the weld while also more evenly distributing temperatures between the two elements at junction 25. FIG. 5 shows plate 35 in more detail. Plate 35 will usually extend above junction 25 by a distance of approximately 1 inch or more, as shown by dimension D. The length of plate 35 below junction 25 as shown by dimension C is usually in a range of at least 2 inches and not more than 6 inches. Preferably, plate 35 is attached by using a minimum amount of spot welding on the bottom screen at location 47. Plate 35 may be more firmly attached by more complete welding at a point 49 at the top of plate 35. Plate 35 will usually have a thickness of at least 0.048 inches and not more than 0.25 inches.

Figure 6:
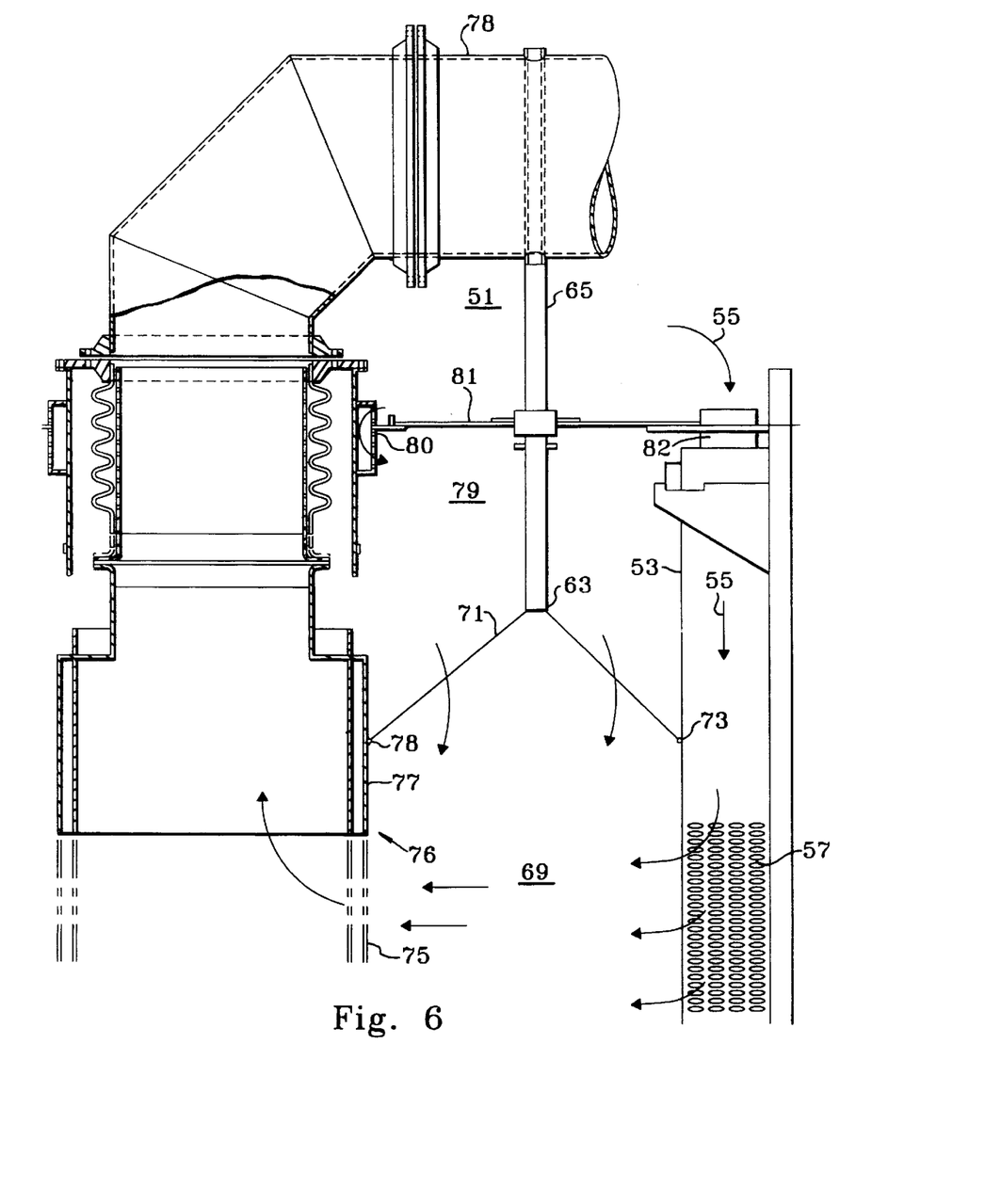
FIG. 6 is a cross-sectional elevation of an upper portion of a prior art moving bed reactor arrangement.

The seal arrangement of this invention can greatly simplify other seal arrangements used in the prior art. FIG. 6 shows a seal arrangement for a typical radial flow reactor that uses scallops to provide a distribution space. In a typical arrangement, catalyst flows from an outlet 63 of a transfer pipe 65 to form a catalyst bed 69 with a conical mounds at its upper end defining a free surface 71. Spacing of the pipes 65 around the circumference of the reactor at regular interval provides a series of intersecting mounds at the top of the catalyst bed 69. Reactant gas flows from a chamber 51 into a scallop 53 along flow line 55 across an inlet port 82. In the typical prior art arrangement gas flows out of scallop 53 from a perforated section 57 that starts below a point 73 where free surface 71 contacts the scallop 53. Gas flows radially across bed 69 into a perforated portion 75 of a center pipe 76 having an imperforate portion 77. Free surface 71 of catalyst bed 69 contacts the imperforate section 77 of the center pipe at a point 78. A gas collection conduit 78 withdraws reacted gases from the center pipe 76.

A portion of the entering reactant gas flows from chamber 51 into a seal zone 79 across a flow control channel 80 having inlet and outlet areas sized to permit only a predetermined portion of the entering reactant gas to flow into seal zone 79. A cover plate arrangement 81 blocks any further gas flow from chamber 51 into seal zone 79. To restrict and control gas flow, cover plate assembly 81 must fit relatively closely to inlet port 82 and the periphery of catalyst transfer pipes 65. Cover Plate 81 ordinarily receives this tight fit to inhibit any catalyst that becomes fluidized in seal zone 79 from entering inlet port 82.

Figure 7:
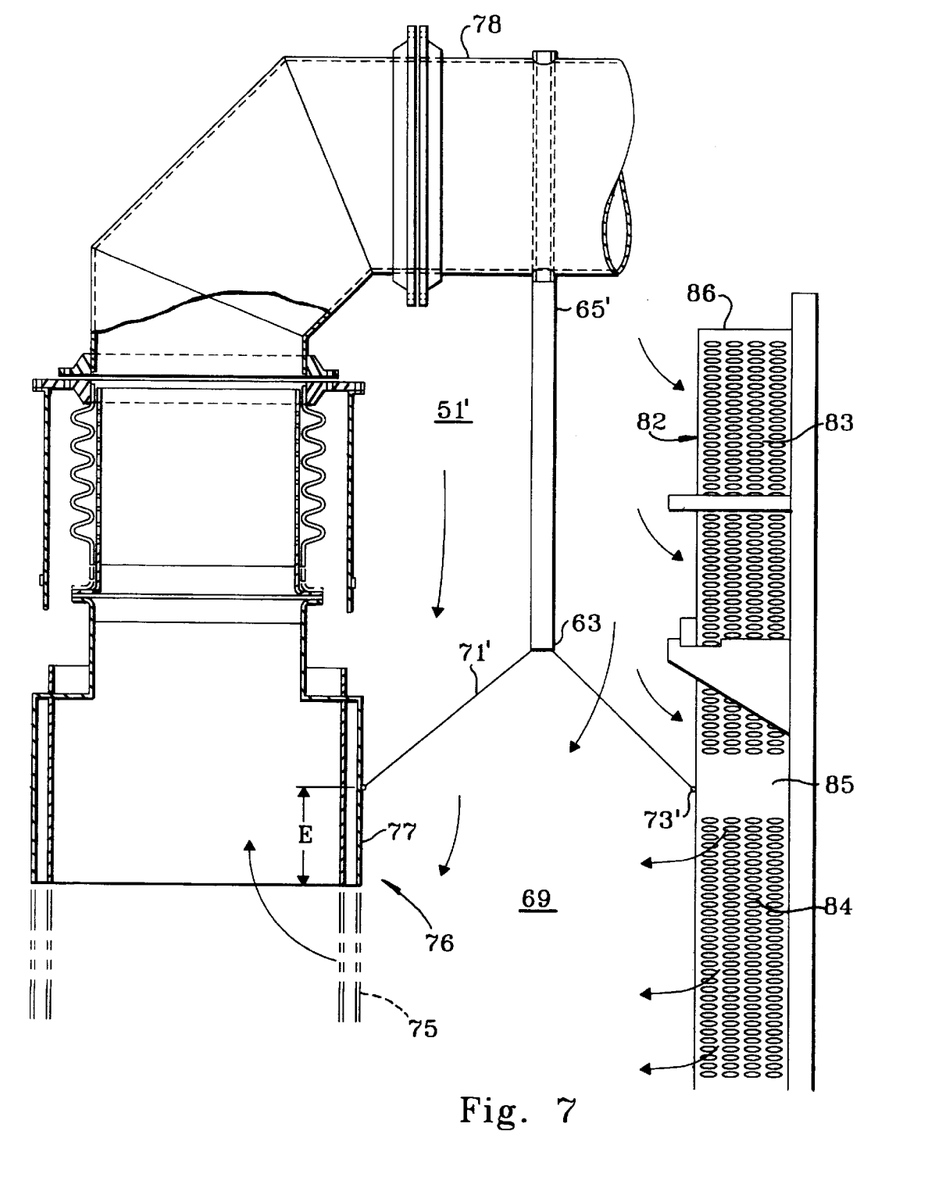
FIG. 7 is a modified view of the cross-section of FIG. 6 incorporating the apparatus of this invention.

FIG. 7 shows the reactor seal zone arrangement of FIG. 6 modified in accordance with this invention. Like elements in FIG. 6 and FIG. 7 are labeled with the same reference numbers. Again, as in FIG. 6, catalyst transfer conduit 65' discharges catalyst from an outlet 63 to form a catalyst bed 69 having a free surface 71'. The arrangement of FIG. 7 perforates a scallop 82 over essentially its entire length and well above a point 73' where free surface 71' contacts scallop 82. Reactants enter from a chamber 51', flow into an upper perforated portion 83 of scallop 82 and flow out through a lower perforated portion 84 of scallop 82. Reactants again flow essentially radially across catalyst bed 69 into a perforated portion 75 of center pipe 76 for withdrawal from the reaction zone by collection conduit 78. A portion of the reactant gases from space 51' again flow through upper bed surface 71' and into catalyst bed 69 before exiting through perforated portion 75 below imperforate portion 77 of center pipe 76. Downward pressure from gas flowing across free surface 71' maintains a catalyst seal and stabilizes the catalyst at the top of bed 69. To avoid any instability at the junction point where the free catalyst surface 71' contacts the outward flowing gases from the scallops may interpose a narrow imperforate section 85 between perforated portions 83 and 84. The imperforate portion may be formed by covering over perforations in the scallops or manufacturing scallops without perforations to provide a small blank-off in the desired area. A catalyst impervious cover preferably closes the top of scallop 82 to afford gas flow into the top of the scallop while blocking the entry of any fluidized catalyst.

The effectiveness of the gas seal provided by this invention is primarily a function of the blank-off region provided in the outlet partition between the upper free surface of the catalyst and the top of the perforations in the outlet partition. This distance is shown by reference letter E in FIGS. 3 and 7. This distance is typically set to be at least 10 inches and more typically at least 14 inches. In most cases the distance E will not exceed 24 inches. Commonly this distance at least equals the minimum width of the particle bed to insure that the fluid flowing from the top of the bed will have at least as much residence time through the catalyst as fluid flowing across the bed.

EXAMPLE 1

Figure 8:
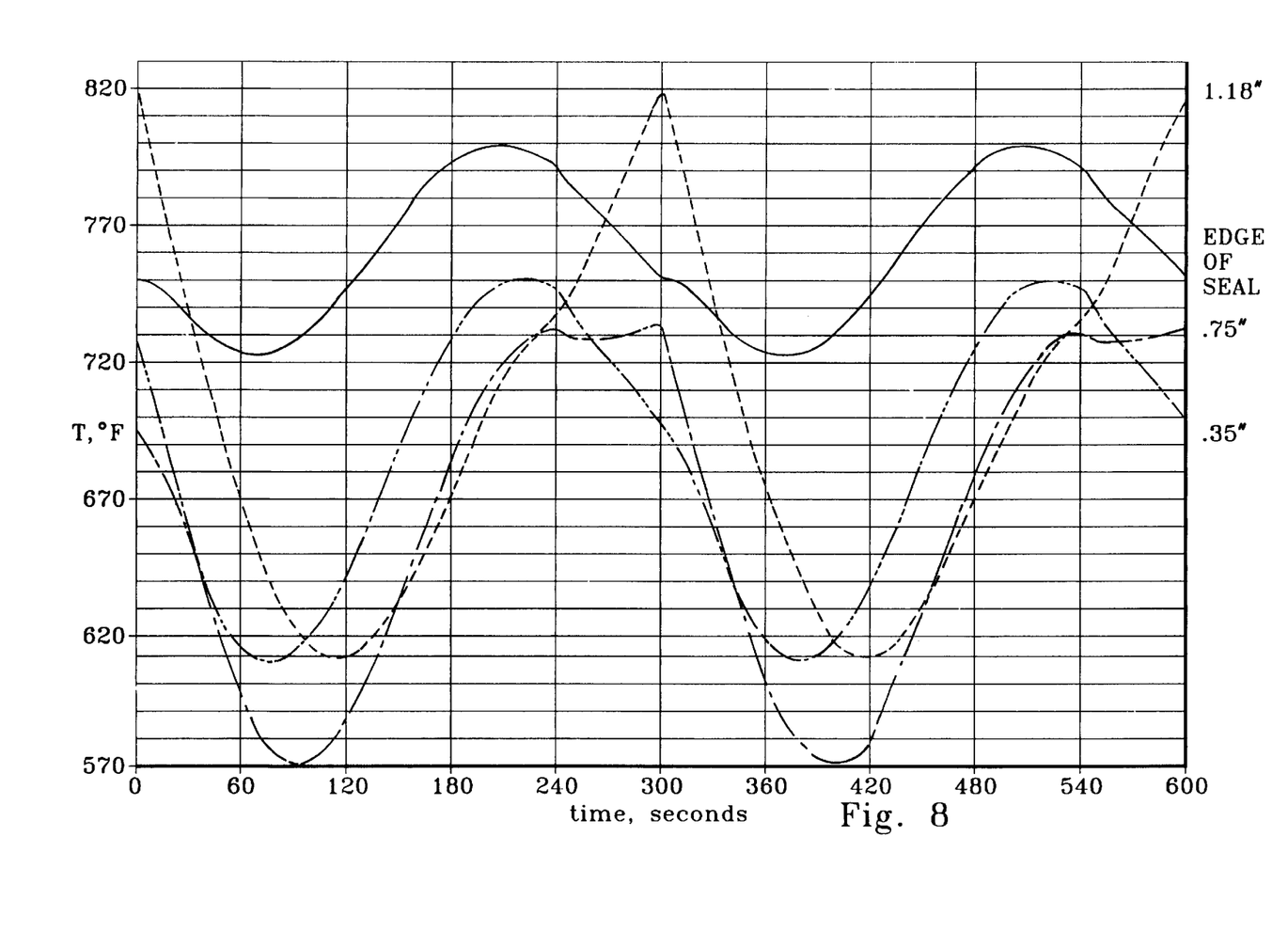
FIG. 8 is a graph showing cyclic temperature variations in an apparatus of the prior art.

Various computer simulation methods confirmed the effectiveness of this invention to reduce thermal cycles and fatigue of the weld between screen junctions. This modeling simulated an inlet screen having a diameter of about 60 inches and an outlet screen having a diameter that varied from 50 inches to about 38 inches over a length of about 75 inches. A blank-off on the outlet screen extended about 18 inches below the lower most point on the free surface at the top of the catalyst bed to the perforations on the outlet partition. The modeling for initial thermal cycling studies used an inlet partition having a perforated section that ended at about the same vertical elevation as the perforated section of the outlet partition. A gas having a temperature of about 890° F. passes through a particulate material having the heat capacity and heat transfer properties of a typical reforming catalyst. Temperature values were predicted at four different elevations along the outlet screen. The edge of seal refers to the uppermost location of the perforations on the outlet screen as indicated by the bottom of line E in FIGS. 3 and 7. The remaining points are spaced progressively downward at 0.35 inches (0.9 cm) below the edge of the seal, at 0.75 inches (1.9 cm) below the edge of the seal, and at 1.18 inches (3 cm) below the edge of the seal. FIG. 8 graphically illustrates the results of this modeling for an ordinary catalyst transfer rate wherein intermittent catalyst loads move through the inlet about every 300 seconds or 5 minutes. As FIG. 8 evidences a wide temperature swing at the same points during the cycle as well as a large temperature variation between the closely adjacent points at any given time in the cycle. Time axis represents the time when a load of cold catalyst first enters the seal zone. The entering catalyst causes a rapid temperature decrease and a gradual recovery until the next point of catalyst addition at 300 seconds when the cycle begins again. As can be seen from FIG. 8, the maximum fluctuation in temperature is over 200° F. and occurs at 1.18 inches (3 cm) past the seal edge. Temperatures at the edge of the seal remain relatively high and experience less variation as compared to the temperatures just past the seal edge. Nevertheless, the large temperature swings and the complete reversal of temperature relative to the edge of seal at 1.18 inches (3 cm) below the edge of seal produced by each cycle will impose extreme thermal stresses at the junction near the edge of the seal.

EXAMPLE 2

Figure 9:
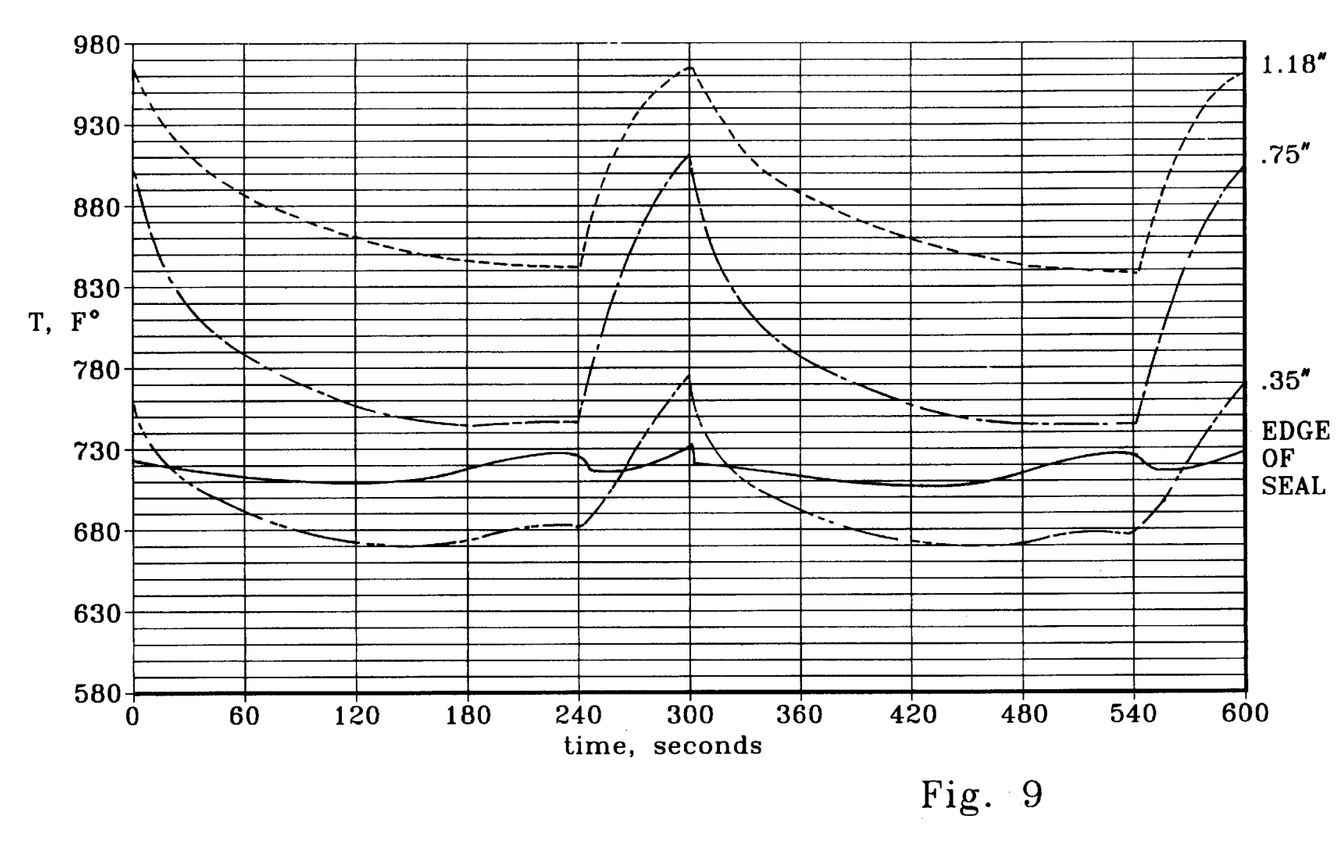
FIG. 9 is a graph showing cyclic temperature variations at the incorporation of this invention.

The modifications of this inventions reduced the temperature fluctuations from the seal arrangement as modeled in Example 1. was employed with modifications to reflect the operation of this invention. The modifications consisted of perforating the entire inlet partition to within about an inch of the catalyst free surface except for a blank off region that began at the level of the outlet partition blank-off and extended upward along the inlet partition for about 6 inches. The model again predicted temperature at the same location plotted in FIG. 8 and under identical gas flow conditions and particulate material properties. FIG. 9 plots the resulting changes in temperature. Although both models were run at the same gas flow temperature the increased seal gas flow through the perforated blank-off region substantially raised the average temperature at the screen junction. As shown by FIG. 9, temperatures were substantially stabilized over that shown in FIG. 8. The maximum predicted swing in temperature now occurs at about 0.75 inches (1.9 cm) from the bottom of the seal and only varies about 150° F. during each cycle. The modifications greatly reduces the overall fluctuation in temperatures and produce a relatively stable temperature profile over the area near the seal.

EXAMPLE III

Figure 10:
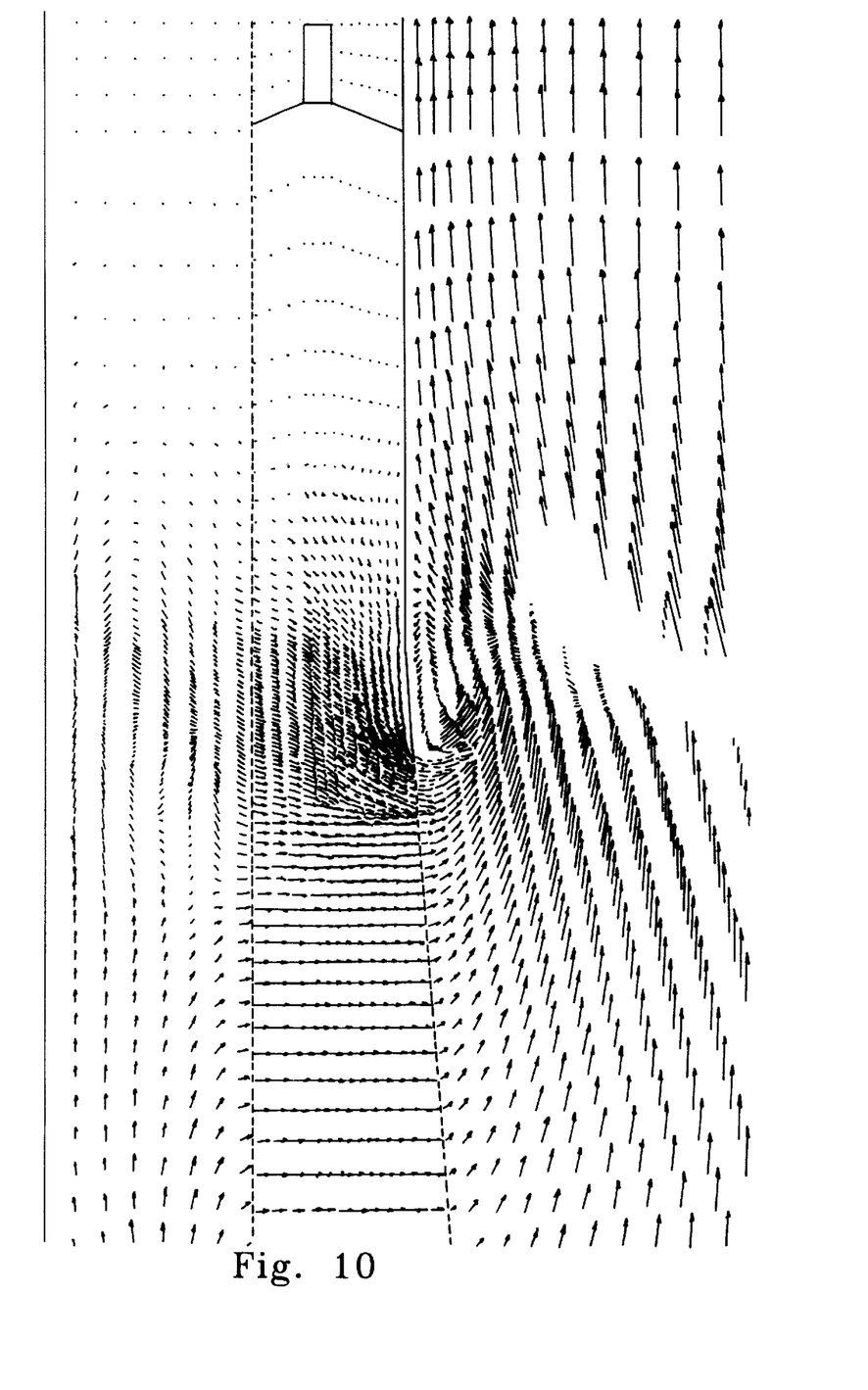
FIG. 10 is a mathematical model of a flow distribution through a screen assembly of this invention showing a gaseous flow distribution through the top of a radial flow bed arrangement in accordance with this invention.

Additional modeling demonstrates the beneficial flow variations created by the seal arrangement of this invention. FIG. 10 contains graphical output from a computer model that mathematically calculates the fluid flow through the perforated partitions, through the particulate material of the beds and through the gas distribution spaces. A model ran with a typical superficial flow across the outlet partition of about 4.5 ft/sec. As shown in FIG. 10, the opening of the inlet partition with perforations above the upper most point of the perforations in the outlet partition causes a substantial portion of the gas to flow into the region of the catalyst bed located above the perforated portion of the outlet partition. The direction of the gas flow into the upper section provides a substantial amount of heating to the catalyst particles as they initially enter the upper portion of the particle bed.

EXAMPLE IV

Figure 11:
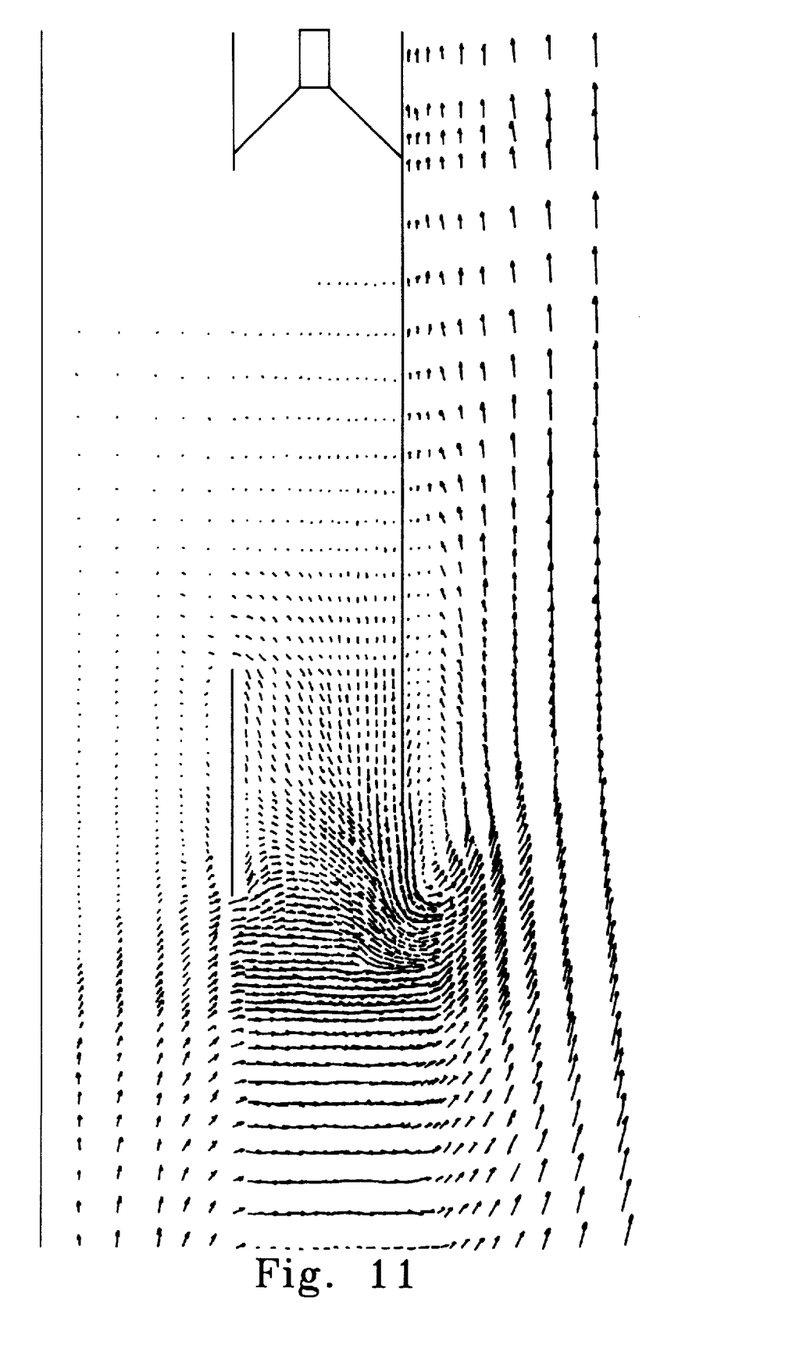
FIG. 11 is another mathematical representation of gas flow through a particle bed arrangement in accordance with this invention and in a slightly modified form from that shown in FIG. 10.

FIG. 11 illustrates the modeled effects of providing a imperforate section between perforated portions on the inlet partition. Apart from the addition of the blank-off the data generated for FIG. 11 used the same model and conditions as that used to generate FIG. 10. This output verifies that the limited blank-off section near the top of the inlet partition diverts a substantial portion of the gas flow from the perforated portion below the blank-off into the perforated portion located above the blank-off. This shifting of gas flow into the upper section of the perforated partition preheats the cold catalyst as it first enters the top of the catalyst bed. Thus, the additional gas flow serves to even out the temperature distribution along the entering column of catalyst and, again, relieve thermal stresses in the outlet partition while utilizing less seal flow that the geometry in FIG. 10.

What is claimed is:

1. A process for passing a fluid in a cross-flow direction through a compact bed of particulate material and periodically replacing the catalyst particles while maintaining the flow of the fluid, said process comprising:

a) confining a particulate material in a vertically extended bed between an inlet partition having perforated section extending over at least part of its length and an outlet partition having a lower perforated portion and upper imperforate portion wherein the size of the perforations retains the particulate material while permitting gas flow therethrough;

b) passing a first portion of a fluid inlet stream substantially transversely into the bed through a first perforated section of the inlet partition located below the imperforate section of the outlet partition;

c) passing a second portion of the fluid inlet stream through a second perforated section of the inlet partition located above the perforated section of the outlet partition;

d) passing a third portion of the fluid inlet stream in substantially unrestricted flow to the top of the particles in the vertically extended bed;

e) recovering a fluid outlet stream from the perforated section of the outlet partition; and, f) at least periodically withdrawing particulate material from the bottom of the vertically extended bed and adding particulate material to the top of the vertically extended bed.

2. The process of claim 1 wherein the volume of the fluid outlet stream equals the sum of the first, second and third fluid portions of the fluid inlet stream.

3. The process of claim 1 wherein the second and third fluid portion equals less than 10% of the total fluid stream.

4. The process of claim 1 wherein the inlet partition has an imperforate portion located between the first and second perforated portions.

5. The process of claim 1 wherein the third fluid portion passes through a flexible screen before entering the particle bed.

6. The process of claim 1 wherein the bed is annular in shape and the fluid passes from the outside to the inside of the bed in radial flow.

7. The process of claim 1 wherein the fluid is a gaseous phase hydrocarbon stream or oxygen containing stream that contacts the particulate material at a temperature greater than 500° F. and the particulate material is a catalyst.

8. The process of claim 7 wherein the gas is an oxygen containing gas, the particulate material is a coke containing catalyst and contact with the oxygen containing gas combusts coke in the extended particle bed.

9. The process of claim 7 wherein the particulate material added to the top of the vertically extended bed is heated by contact with the fluid inlet stream before passing into the perforated portion of the outlet partition.

* * * * *